(12) United States Patent
Troegel

(10) Patent No.: US 8,795,613 B2
(45) Date of Patent: Aug. 5, 2014

(54) METHOD FOR REDUCING THE ALUMINUM CONTENT OF NEOPENTASILANE

(75) Inventor: Dennis Troegel, Maisach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/004,341

(22) PCT Filed: Feb. 28, 2012

(86) PCT No.: PCT/EP2012/053300
§ 371 (c)(1),
(2), (4) Date: Sep. 10, 2013

(87) PCT Pub. No.: WO2012/119884
PCT Pub. Date: Sep. 13, 2012

(65) Prior Publication Data
US 2014/0004029 A1  Jan. 2, 2014

(30) Foreign Application Priority Data
Mar. 10, 2011 (DE) .......................... 10 2011 005 387

(51) Int. Cl.
*B01D 11/00* (2006.01)

(52) U.S. Cl.
USPC .......................................... 423/112; 423/347

(58) Field of Classification Search
USPC ......................................... 423/347, 111, 112
See application file for complete search history.

(56) References Cited

U.S. PATENT DOCUMENTS 8,147,789 B2 * 4/2012 Cannady et al. .............. 423/347

FOREIGN PATENT DOCUMENTS

JP  01-144504 A2  6/1989

OTHER PUBLICATIONS

Hofler & Jannach, "Note of Neopentasilans" Inorg. Nucl. Chem. Letters, 1973; vol. 9, pp. 723-725.
Robert Freund, "New Aspects Regarding Base-Catalyzed Polycondensation of Silanes and the Preparative Chemistry of Silanes and Silyl Atoms," Inaugural Dissertation 1973,University of Cologne, pp. 142-155.

* cited by examiner

*Primary Examiner* — Edward Johnson
(74) *Attorney, Agent, or Firm* — Brooks Kushman P.C.

(57) ABSTRACT

The aluminum content of neopentasilane is reduced by treatment with organic compounds D which contain N, O, and/or S atoms and which have free electron pairs on these atoms.

26 Claims, No Drawings

METHOD FOR REDUCING THE ALUMINUM CONTENT OF NEOPENTASILANE

CROSS-REFERENCE TO RELATED APPLICATIONS

This application is the U.S. National Phase of PCT Appln. No. PCT/EP2012/053300 filed Feb. 28, 2012 which claims priority to German Application No. 10 2011 005 387.5 filed Mar. 10, 2011, the disclosures of which are incorporated in their entirety by reference herein.

BACKGROUND OF THE INVENTION

1. Field of the Invention

The invention relates to a process for reducing the aluminum content of neopentasilane by treatment with organic compounds.

2. Description of the Related Art

Neopentasilane (NPS, tetrakis(trihydridosilyl)silane) can be used as a precursor for the deposition of silicon-containing films by means of chemical vapor deposition (CVD). The advantage of NPS lies in the high deposition rate of Si or SiC in the CVD operation, and the comparatively low deposition temperatures compared to other silanes (J. C. Sturm, K. H. Chung, *ECS Transactions* 2008, 16, 799-805).

Suitable synthesis processes for preparation of NPS on the industrial scale are described in WO 2008051328, WO 2010043551 and WO 2010149547.

WO 2008051328 describes the reaction of hexachlorodisilane (HCDS) with tertiary amines as catalysts to give dodecachloroneopentasilane (CNPS). This route to neopentasilanes was improved in WO 2010043551 using ether compounds, more particularly tetrahydrofuran (THF), as catalysts. In the second step of the preparation process described in WO 2008051328, the resulting dodecachloroneopentasilane is reduced with diisobutylaluminum hydride (DIBAH) to NPS. The process, however, has the disadvantage that the resulting NPS, in spite of purification by means of distillation or condensation, still contains distinct proportions of organoaluminum impurities (in particular diisobutylaluminum chloride (DIBAC)). However, aluminum as a dopant element influences the semiconductor properties of silicon, and so the content of aluminum has to be reduced to a minimum for many applications of silicon-containing films.

SUMMARY OF THE INVENTION

The invention provides a process for reducing the aluminum content of neopentasilane by treatment with organic compounds D which contain atoms selected from N, O and S and which have free electron pairs on these atoms.

DETAILED DESCRIPTION OF THE PREFERRED EMBODIMENTS

It has been surprisingly found that the addition of small amounts of organic compounds D reduces the Al content of NPS to a degree which is impossible by the use of other substance groups. For instance, residual aluminum contents which occur in the preparation and are typically in the order of magnitude of about 3000 ppm can be reduced to a content of <100 ppm of Al. The NPS thus purified, due to its low Al content, is usable for production of silicon-containing films, particularly in semiconductor technology or photovoltaics. A further advantage of the process is that NPS, an extremely chemically sensitive and reactive substance, is stable towards the compounds D.

The organic compounds D form alane-donor adducts with the aluminum compounds via the free electron pairs on the selected N, O or S atoms. Preferably, the treatment with organic compounds D is performed after the NPS preparation which is known per se. The adducts which form with the organic compounds D and the aluminum compounds can be removed readily from the NPS.

Preference is given to using compounds D which form nonvolatile adducts. In a subsequent condensation step, NPS is removed from the adducts formed.

The organic compounds D may be monomeric or polymeric. They may contain one or more atoms with free electron pairs selected from N, O and S. The compounds D may contain identical or different atoms with free electron pairs selected from N, O and S.

Compounds D which have nitrogen atoms with free electron pairs may be monomeric or polymeric nitrogen compounds, for example ammonia, primary, secondary or tertiary amines, amides, nitriles, imines, aldimines, nonaromatic azacycles or aromatic azacycles.

Preference is given to amines of the general formula I $$NR^1R^2R^3 \qquad (I)$$

where
$R^1, R^2, R^3$ are each hydrogen or a $C_1$-$C_{20}$-hydrocarbyl radical in which one or more nonadjacent methylene units may be replaced by —O—, —CO—, —COO—, —OCO—, or —OCOO—, —S—, or —NR$^x$— groups and in which one or more nonadjacent methine units may be replaced by —N=, —N=N— or —P= groups, where two or three of the $R^1, R^2, R^3$ radicals may be joined to one another,
$R^x$ is hydrogen or a $C_1$-$C_{10}$-hydrocarbyl radical,
with the proviso that at most two of the $R^1, R^2, R^3$ radicals may be hydrogen.

The $C_1$-$C_{20}$-hydrocarbyl radicals $R^1, R^2, R^3$ may be aliphatically saturated or unsaturated, aromatic, straight-chain or branched. $R^1, R^2, R^3$ have preferably 1 to 12 atoms, more preferably 3 to 10 atoms, especially only carbon atoms.

When two of the $R^1, R^2, R^3$ radicals in the general formula I are joined to one another, the compounds are nonaromatic azacycles. Preferably, the radicals joined to one another together form a divalent $C_4$-$C_{11}$-hydrocarbyl radical, especially with 4, 5, 6, 7 or 9 carbon atoms. Particular preference is given to pyrrolidine, piperidine and hexamethyleneimine.

Likewise preferred compounds D which may have nitrogen atoms with free electron pairs are aromatic azacycles having preferably 4 to 10 ring atoms which are selected from C, S and O. Preferably, all non-nitrogen ring atoms are carbon atoms. Particular preference is given to pyridine, pyrrole, azatropilidene, quinoline, isoquinoline and indole.

Compounds D which have oxygen atoms with free electron pairs may be monomeric or polymeric oxygen compounds, for example ethers, alkoxides, carbonyls, carboxylates, nonaromatic oxacycles or aromatic oxacycles.

Preference is given to ethers of the general formula II $$OR^4R^5 \qquad (II)$$

where
$R^4, R^5$ are each a $C_1$-$C_{20}$-hydrocarbyl radical in which one or more nonadjacent methylene units may be replaced by —O—, —CO—, —COO—, —OOO—, or —OCOO—, —S— or —NR$^y$— groups and in which one or more nonadjacent methine units may be replaced by —N=, —N=N— or —P= groups, where the $R^4$, $R^5$ radicals may be joined to one another, and $R^y$ is hydrogen or a $C_1$-$C_{10}$-hydrocarbyl radical.

The $C_1$-$C_{20}$-hydrocarbyl radicals $R^4$, $R^5$ may be aliphatically saturated or unsaturated, aromatic, straight-chain or branched. $R^4$, $R^5$ have preferably 1 to 12 atoms, more preferably 3 to 10 atoms, especially only carbon atoms.

When the $R^4$, $R^5$ radicals in the general formula II are joined to one another, the compounds are oxacycles. The radicals joined to one another together are preferably a divalent $C_4$-$C_{11}$-hydrocarbyl radical, especially having 4, 5, 7 or 9 carbon atoms. All non-oxygen ring atoms are preferably carbon atoms. Particular preference is given to furan, tetrahydrofuran, pyran, tetrahydropyran, hexamethylene oxide, oxacycloheptatriene and benzofuran.

Compounds D which have sulfur atoms with free electron pairs may be monomeric or polymeric sulfur compounds, for example thioethers, thiolates, thiols, thiocarbonyls, thiocyanates, thiocarboxylates, non-aromatic thiacycles or aromatic thiacycles.

Preference is given to thioethers of the general formula III

$$SR^6R^7 \quad (III)$$

where $R^6$, $R^7$ are each a $C_1$-$C_{20}$-hydrocarbyl radical in which one or more nonadjacent methylene units may be replaced by —O—, —CO—, —COO—, —OOO—, or —OCOO—, —S— or —$NR^z$— groups and in which one or more nonadjacent methine units may be replaced by —N=, —N=N— or —P= groups, where the $R^6$, $R^7$ radicals may be joined to one another, and $R^z$ is hydrogen or a $C_1$-$C_{10}$-hydrocarbyl radical.

The $C_1$-$C_{20}$-hydrocarbyl radicals $R^6$, $R^7$ may be aliphatically saturated or unsaturated, aromatic, straight-chain or branched. $R^6$, $R^7$ have preferably 1 to 12 atoms, more preferably 3 to 10 atoms, especially only carbon atoms.

When the $R^6$, $R^7$ radicals in the general formula III are joined to one another, the compounds are thiacycles. The radicals joined to one another preferably together form a divalent $C_4$-$C_{11}$-hydrocarbyl radical, especially having 4, 5, 7 or 9 carbon atoms. All non-sulfur ring atoms are preferably carbon atoms. Particular preference is given to thiolane, thiophene, thiane, hexamethylene sulfide, thiotropilidene and benzothiophene.

Likewise preferred are compounds which contain 2 or more identical or different atoms with free electron pairs selected from N, O and S. These compounds may be aliphatically saturated or unsaturated, cyclic or acyclic, aromatic, straight-chain or branched. Examples of acyclic compounds are tetramethylethylenediamine, monoethanolamine, dimethoxyethane, 2-methoxyethylamine and mercaptoethanol.

The heterocycles contain preferably 5 to 30 ring atoms and may be monocyclic, bicyclic or polycyclic. Examples of heterocycles are piperazine, imidazole, benzimidazole, pyrimidine, morpholine, oxazole, pyrazole, triazole, benzoxazole, triazole [18]crown-6, diaza-[18]crown-6 and [2.2.2]cryptand.

The polymeric organic compounds D may have the atoms with free electron pairs selected from N, O and S within the polymer chain, for example in poly(ethylene oxide), or bear side groups which have the atoms with free electron pairs selected from N, O and S, for example poly(4-vinylpyridine).

It is also possible for the organic compounds D to be bonded physically or chemically to an inorganic matrix. For example, the compounds D as aminoalkyl groups may be bonded to a polysiloxane or to a silica surface.

The process is preferably performed at a temperature of at least −65° C., more preferably at least −10° C., and most preferably at least 0° C., and at most 90° C., more preferably at most 60° C., and most preferably at most 40° C.

The adducts of compounds D and the aluminum compounds are typically less volatile than NPS.

In a preferred embodiment, a compound D more volatile than NPS is used. Preference is given in this case to using the compound D very close to the stoichiometric ratio relative to the aluminum compounds present in the NPS. Compound D preferably boils, at 0.1 MPa, at least 10° C. and more preferably at least 20° C. lower than NPS. In this embodiment, it is possible first to remove compound D and then NPS by distillation from the adducts of compounds D and the aluminum compounds.

In a further preferred embodiment, a compound D which is less volatile than NPS is used. Compound D preferably boils, at 0.1 MPa, at least 10° C. and more preferably at least 20° C. higher than NPS. In this embodiment, NPS can first be removed by distillation from compound D and the adducts of compounds D and the aluminum compounds.

In a further preferred embodiment, a compound D which is insoluble in the NPS is used. The compound D is preferably solid in this case and can, after the reaction, be removed physically together with the adduct formed. For example, the removal is accomplished by filtration or centrifugation, or NPS as the liquid mobile phase is passed through a stationary phase comprising the compound D. NPS can also be passed in gaseous form as the mobile phase through a stationary phase containing the compound D.

Neopentasilane can be reacted with compound D in pure form or as a constituent of mixtures. For example, NPS may be present in the process mixed with an aprotic solvent. Examples of such solvents are chlorinated hydrocarbons, such as dichloromethane, trichloromethane, tetrachloromethane, 1,2-dichloroethane, trichloroethylene; hydrocarbons, such as pentane, n-hexane, hexane isomer mixtures, heptane, octane, white spirit, petroleum ether, benzene, toluene, xylenes; siloxanes, especially linear dimethylpolysiloxanes with trimethylsilyl end groups having preferably 0 to 6 dimethylsiloxane units, or cyclic dimethylpolysiloxanes having preferably 4 to 7 dimethylsiloxane units, for example hexamethyldisiloxane, octamethyltrisiloxane, octamethyltetrasiloxane and decamethylcyclopenta-siloxane; carbon disulfide and nitrobenzene, or mixtures of these solvents.

The solvent is preferably less volatile than NPS. The solvent preferably boils, at 0.1 MPa, at least 10° C. and more preferably at least 20° C. higher than NPS.

All above symbols in the above formulae are each defined independently of one another. In all formulae, the silicon atom is tetravalent.

Unless stated otherwise, the examples which follow were conducted in an atmosphere of dry argon 5.0, and at a pressure of the surrounding atmosphere, i.e. about 1013 mbar, and at room temperature, i.e. at about 23° C.

All percentage figures in the examples are based on weight, unless stated otherwise.

The solvents used for the syntheses were dried by standard methods and stored under a dry argon atmosphere. The commercially available deuterated solvents used for the NMR spectroscopy were used directly for measurement from ampoules opened by melting without further purification. The following methods and materials were used in the examples:

Nuclear magnetic resonance spectroscopy (NMR): All chemical shifts reported are based on the δ scale and are reported in ppm. The $^1H$, $^{13}C\{^1H\}$ and $^{29}Si\{^1H\}$ NMR spectra were recorded with an Avance 300 ($^1H$, 300.1 MHz; $^{29}Si$, 59.6 MHz) or Avance 500 instrument ($^1$H, 500.1 MHz; $^{13}$C, 125.8 MHz; $^{29}$Si, 99.4 MHz) from Bruker at 23° C. $C_6D_6$ was used as the solvent. The samples (~0.1 ml) were dissolved in 0.7 ml of $C_6D_6$ in an NMR tube of diameter 5 mm. Chemical shifts (ppm) were determined relative to internal $C_6HD_5$ ($^1$H, δ=7.28, $C_6D_6$), internal $C_6D_6$ ($^{13}$C, δ=128.0, $C_6D_6$) or external TMS ($^{29}$Si, δ=0; $C_6D_6$). All $^{13}$C and $^{29}$Si NMR spectra were recorded with $^1$H broadband decoupling. The values of the coupling constants reported are magnitudes; the signs were not determined. The abbreviations used for the multiplicities are defined as follows: s, singlet; d, doublet; q, quartet; ht, heptet of triplets; c, complex. In the calculation of proportions by mass of the respective components of the composition from the integration of the $^1$H NMR spectrum, the estimated error is ±1%.

Inductively coupled plasma (ICP) emission spectroscopy: The qualitative and quantitative determination of aluminum and other elements specified was conducted with the Perkin Elmer Optima 7300 DV instrument. The samples were made up as follows: An exactly defined amount of NPS composition (~300 mg) was added dropwise under an argon atmosphere to a defined amount of 1M sodium hydroxide solution while stirring (~3 g), in the course of which hydrolytic decomposition set in with slight heating and evolution of gas. After the addition had ended, the mixture was stirred under argon for 24 h in order to ensure the completeness of the hydrolytic decomposition. To determine the Al content, the aqueous solution obtained was digested with 5 ml of nitric acid (65%) and 1 ml of hydrofluoric acid (40%), and analyzed against untreated 1M sodium hydroxide solution as the reference. All Al contents reported are based on the amount of NPS composition used and are reported in ppm; the mean error is ±38 ppm (P=95%). The results of the Al content determinations of examples 2-11 and comparative example 1 are compiled in table 1.

The following materials were purchased from commercial sources and used directly without further purification: hexachlorodisilane (HCDS), <=100% (Wacker Chemie AG); tetrahydrofuran (THF), 99.9% (Sigma-Aldrich); diisobutylaluminum hydride (DIBAH), 100% (Akzo Nobel Polymers Chemicals); tributylamine, 99% (Sigma-Aldrich); triethylamine, 99.7% (Acros Organics); N,N,N',N'-tetramethylethylenediamine (TMEDA), 99.5% (Sigma-Aldrich); n-octylamine, 98% (Fluka); diisopropylamine, 99% (Merck); piperidine, 99% (Sigma-Aldrich); di-n-butyl ether, 99.5% (Sigma-Aldrich); poly(4-vinylpyridine) (Sigma-Aldrich); polyethylene oxide, 100% (Sigma-Aldrich).

Example 1

The preparation of dodecachloroneopentasilane (CNPS) was conducted based on WO 2010043551: an apparatus consisting of a 2 l reactor with precision glass stirrer, Vigreux column, condenser, distillation vessel (500 ml flask) and 2 l collecting flask was baked out under reduced pressure (reactor jacket heated to 100° C., hot air gun at 500° C. for other apparatus parts) and filled with argon. 1500 g of HCDS (5.58 mmol) were admixed with 30 ml of anhydrous THF in the reactor and heated to 120° C. while stirring for a total of 45 h. The distillate formed was collected continuously in the receiver (569 g; b.p. 56° C.). The pale yellowish suspension present in the reactor was transferred into the collecting flask with n-hexane (4×50 ml) and cooled to −114° C., and the insoluble colorless solid was filtered off under cold conditions, washed with silicon tetrachloride (2×10 ml) and dried under reduced pressure (0.03 mbar, 50° C., 14 h). After further purification by means of sublimation under reduced pressure (0.02 mbar, 100° C., 90 min), 508 g (898 mmol; 64%) of a colorless solid were obtained. $^{29}$Si NMR (99.4 MHz, $C_6D_6$): δ=3.5 (SiCl$_3$), −80.9 (Si$_q$).

Example 2

The preparation of neopentasilane (NPS) was conducted based on WO 2008051328: DIBAH (702 g, 4.94 mol) was added dropwise to CNPS (202 g, 357 mmol) in an argon atmosphere while stirring at 30° C. within 3 h, and the resulting reaction mixture was stirred at 23° C. for 24 h. The clear colorless mixture was heated at 40° C. under reduced pressure (0.03 mbar) with stirring for 90 min, and the volatile constituents were collected in a cold trap at −196° C. The condensate was thawed to 23° C. Residue: 846 g (4.79 mmol); 97%) of diisobutylaluminum chloride (DIBAC) were obtained as a colorless liquid. 1H NMR (500.1 MHz, $C_6D_6$): δ=0.59 (d, $^3J_{HH}$=6.9 Hz, 4H, CH$_2$), 1.16 (d, $^3J_{HH}$=6.3 Hz, 12H, CH$_3$), 2.14 (ht, $^3J_{HH}$=6.9 Hz, $^3J_{HH}$=6.3 Hz, 2H, CH). $^{13}$C-NMR (125.8 MHz, $C_6D_6$): δ=25.3 (CH$_2$), 25.8 (CH), 27.8 (CH$_3$). Condensate: 49.6 g of a colorless liquid were obtained, containing 67% NPS, 4% (H$_3$Si)$_3$Si(SiH$_2$CH$_3$) (Me-NPS), 21% other silanes (Si$_n$H$_{2n+2}$), 7% hydrocarbons (C$_n$H$_{2n+2}$) and 1% DIBAC. The identification of the components and the purity of the composition were determined from the $^1$H NMR spectrum: $^1$H NMR (500.1 MHz, $C_6D_6$): δ=0.26 (t, $^3J_{HH}$=4.8 Hz, (H$_3$Si)$_3$Si(SiH$_2$CH$_3$); Me-NPS), 0.58 (d, $^3J_{HH}$=6.9 Hz, CH$_2$; DIBAC), 0.82-1.97 (c, C—H; C$_n$H$_{2n+2}$), 1.15 (d, $^3J_{HH}$=6.3 Hz, CH$_3$; DIBAC), 2.13 (ht $^3J_{HH}$=6.9 Hz, $^3J_{HH}$=6.3 Hz, CH; DIBAC), 3.27-3.81 (c, Si—H; Si$_n$H$_{2n+2}$), 3.61 (s, Si (SiH$_3$)$_4$; NPS); 4.02 (q, $^3J_{HH}$=4.8 Hz, (H$_3$Si)$_3$Si (SiH$_2$CH$_3$); Me-NPS). $^{29}$Si NMR (59.6 MHz, $C_6D_6$): δ=−88.2 (Si$_q$; Me-NPS), −89.0, −90.0, −90.6 and −91.5 (Si; Si$_n$H$_{2n+2}$, −89.5 (SiH$_3$; NPS), −165.8 (Si$_q$; NPS). The Al content was 3132 ppm (ICP). The contents of Ag, As, B, Bi, Cd, Co, Cr, Cu, Fe, Ga, In, Li, Mn, Nb, Ni, P, T1, Zn at <5 ppm and those of Sb, Pt at <10 ppm are below the detection limit of the respective element.

Example 3

4.51 g of NPS composition from example 2 were admixed with 71 mg of n-octylamine (0.548 mmol) while stirring, and the resulting mixture was stirred at 23° C. for 24 h and then purified by condensation under reduced pressure according to example 2. This gave 4.16 g of a colorless liquid containing 70% NPS, 5% Me-NPS, 21% other silanes (Si$_n$H$_{2n+2}$), 3% hydrocarbons (C$_n$H$_{2n+2}$) and an Al content of 22 ppm (ICP).

Example 4

4.11 g of NPS composition from example 2 were admixed with 51 mg of diisopropylamine (0.500 mmol) while stirring, and the resulting mixture was stirred at 23° C. for 24 h and then purified by condensation under reduced pressure according to example 2. This gave 3.73 g of a colorless liquid containing 67% NPS, 5% Me-NPS, 23% other silanes (Si$_n$H$_{2n+2}$), 4% hydrocarbons (C$_n$H$_{2n+2}$) and an Al content of 34 ppm (ICP).

Example 5

3.89 g of NPS composition from example 2 were admixed with 40 mg of piperidine (0.474 mmol) while stirring, and the resulting mixture was stirred at 23° C. for 24 h and then purified by condensation according to example 2. This gave 3.64 g of a colorless liquid containing 67% NPS, 6% Me- NPS, 24% other silanes (Si$_n$H$_{2n+2}$), 3% hydrocarbons (C$_n$H$_{2n+2}$) and an Al content of <1 ppm (ICP).

Example 6

4.13 g of NPS composition from example 2 were admixed with 51 mg of triethylamine (0.503 mmol) while stirring, and the resulting mixture was stirred at 23° C. for 24 h and then purified by condensation according to example 2. This gave 3.68 g of a colorless liquid containing 67% NPS, 5% Me-NPS, 23% other silanes (Si$_n$H$_{2n+2}$) 5% hydrocarbons (C$_n$H$_{2n+2}$) and an Al content of 58 ppm (ICP).

Example 7

4.63 g of NPS composition from example 2 were admixed with 105 mg of tri-n-butylamine (0.563 mmol) while stirring, and the resulting mixture was stirred at 23° C. for 24 h and then purified by condensation according to example 2. This gave 3.96 g of a colorless liquid containing 72% NPS, 5% Me-NPS, 18% other silanes (Si$_n$H$_{2n+2}$), 5% hydrocarbons (C$_n$H$_{2n+2}$) and an Al content of 42 ppm (ICP).

Example 8

4.21 g of NPS composition from example 2 were admixed with 60 mg of N,N,N',N'-tetramethylethylenediamine (TMEDA; 0.513 mmol) while stirring, and the resulting mixture was stirred at 23° C. for 24 h and then purified by condensation according to example 2. This gave 3.85 g of a colorless liquid containing 73% NPS, 4% Me-NPS, 19% other silanes (Si$_n$H$_{2n+2}$), 3% hydrocarbons (C$_n$H$_{2n+2}$) and an Al content of 26 ppm (ICP).

Example 9

55 mg of poly(4-vinylpyridine) were admixed with 4.52 g of NPS composition from example 2 while stirring, and the resulting suspension was stirred at 23° C. for 24 h. The liquid constituents were purified by condensation according to example 2. This gave 4.08 g of a colorless liquid containing 67% NPS, 6% Me-NPS, 24% other silanes (Si$_n$H$_{2n+2}$), 3% hydrocarbons (C$_n$H$_{2n+2}$) and an Al content of 70 ppm (ICP).

Example 10

2.69 g of NPS composition from example 2 were admixed with 43 mg of di-n-butyl ether (0.328 mmol) while stirring, and the resulting mixture was stirred at 23° C. for 60 h and then purified by condensation according to example 2. This gave 2.37 g of a colorless liquid containing 62% NPS, 5% Me-NPS, 28% other silanes (Si$_n$H$_{2n+2}$), 5% hydrocarbons (C$_n$H$_{2n+2}$) and an Al content of <1 ppm (ICP).

Example 11

2.74 g of NPS composition from example 2 were admixed with 46 mg of poly(ethylene oxide) (M~600,000 g/mol) while stirring, and the resulting mixture was stirred at 23° C. for 60 h and then purified by condensation according to example 2. This gave 2.04 g of a colorless liquid containing 53% NPS, 5% Me-NPS, 37% other silanes (Si$_n$H$_{2n+2}$), 5% hydrocarbons (C$_n$H$_{2n+2}$) and an Al content of <1 ppm (ICP).

Comparative Example 1 (Noninventive)

3.69 g of NPS composition from example 2 were purified directly, without further pretreatment, by a further condensation according to example 2. This gave 3.45 g of a colorless liquid containing 67% NPS, 5% Me-NPS, 24% other silanes (Si$_n$H$_{2n+2}$), 4% hydrocarbons (C$_n$H$_{2n+2}$) and an Al content of 435 pmm (ICP).

TABLE 1

Aluminum content after treatment of NPS with donor bases D and subsequent condensation.

| Example No. | Compound D used | Al content (ICP) [ppm] |
|---|---|---|
| 2* | — | 3132 |
| 3 | n-octylamine | 22 |
| 4 | diisopropylamine | 34 |
| 5 | piperidine | <1 |
| 6 | triethylamine | 58 |
| 7 | tri-n-butylamine | 42 |
| 8 | TMEDA | 26 |
| 9 | poly(4-vinylpyridine) | 70 |
| 10 | di-n-butyl ether | <1 |
| 11 | poly(ethylene oxide) | <1 |
| Comparative example 1* | only condensation without D | 435 |

*noninventive

The invention claimed is:

1. A process for reducing the aluminum content of a neopentasilane composition isolated from a preparation of neopentasilane, comprising treating the neopentasilane composition with at least one organic compound D which contains N and/or S atoms, wherein at least one of the N and/or S atoms have at least one free electron pair.

2. The process of claim 1, in which compounds D which have nitrogen atoms with free electron pairs are monomeric or polymeric nitrogen compounds which are primary, secondary or tertiary amines, amides, nitriles, imines, aldimines, nonaromatic azacycles, aromatic azacycles, or mixtures thereof.

3. The process of claim 1, in which compounds D which have sulfur atoms with free electron pairs are monomeric or polymeric sulfur compounds which are thioethers, thiolates, thiols, thiocarbonyls, thiocyanates, thiocarboxylates, nonaromatic thiacycles, aromatic thiacycles, or mixtures thereof.

4. The process of claim 1, which is performed at least −65° C. and at most 90° C.

5. The process of claim 2, which is performed at least −65° C. and at most 90° C.

6. The process of claim 3, which is performed at least −65° C. and at most 90° C.

7. A process for reducing the aluminum content of neopentasilane, comprising
  a) synthesizing neopentasilane by reduction of dodecachloroneopentasilane with an aluminum compound, forming a product mixture containing neopentasilane;
  b) separating a first aluminum-containing neopentasilane fraction from the product mixture;
  c) reducing the aluminum content of the first aluminum-containing neopentasilane fraction by treating the fraction with at least one organic compound D containing at least one oxygen, nitrogen, or sulfur atom bearing at least one free electron pair to form an adduct of compound D containing aluminum; and
  d) separating neopentasilane from the adduct and thereby recovering a second neopentasilane fraction containing a reduced aluminum content relative to the aluminum content of the first neopentasilane fraction.

8. The process of claim 7, in which compounds D which have oxygen atoms with free electron pairs are monomeric or polymeric oxygen compounds which are alkoxides, carbonyls, carbonyls, carboxylates, nonaromatic oxacycles, aromatic oxacycles, or mixtures thereof.

9. The process of claim 7, wherein the compound D is an ether of the formula $$OR^4R^5$$

where

R$^4$, R$^5$ are each a C$_1$-C$_{20}$-hydrocarbyl radical in which one or more nonadjacent methylene units are optionally replaced by —O—, —CO—, —COO—, —OCO—, or —OCOO—, —S— or —NR$^y$—groups and in which one or more nonadjacent methine units are optionally replaced by —N═, —N═N— or —P═ groups, where the R$^4$, R$^5$ radicals are optionally joined to one another, and R$^y$ is hydrogen or a C$_1$-C$_{10}$-hydrocarbyl radical.

10. The process of claim 9, wherein at least one compound D is selected from the group consisting of furan, tetrahydrofuran, pyran, tetrahydropyran, hexamethylene oxide, oxacycloheptatriene and benzofuran.

11. The process of claim 7, wherein compound D is less volatile than neopentasilane.

12. The process of claim 1, wherein compound D boils at a temperature at least 10° C. higher than the boiling point of neopentasilane, at 0.1 MPa.

13. The process of claim 7, wherein compound D is more volatile than neopentasilane.

14. The process of claim 13, wherein compound D boils at a temperature at least 10° C. lower than the boiling point of neopentasilane, at 0.1 MPa.

15. The process of claim 7, wherein the adduct of compound D containing aluminium is less volatile than neopentasilane, and neopentasilane is separated from the adduct by distillation.

16. The process of claim 7, wherein the aluminium content of the neopentasilane is reduced to less than 100 ppm.

17. The process of claim 1, wherein the aluminium content of the neopentasilane is reduced to less than 100 ppm.

18. The process of claim 1, wherein at least one organic compound D has the formula $$NR^1R^2R^3$$

where

R$^1$, R$^2$, R$^3$ are each hydrogen or a C$_1$-C$_{20}$-hydrocarbyl radical in which one or more nonadjacent methylene units are optionally replaced by —O—, —CO—, —COO—, —OCO—, or —OCOO—, —S—, or —NR$^x$- groups and in which one or more nonadjacent methine units are optionally replaced by —N═, —N═N— or —P═ groups, where two or three of the R$^1$, R$^2$, R$^3$ radicals are optionally joined to one another, R$^x$ is hydrogen or a C$_1$-C$_{10}$-hydrocarbyl radical, with the proviso that at most two of the R$^1$, R$^2$, R$^3$ radicals are hydrogen.

19. The process of claim 18, where at least one organic compound D is selected from the group consisting of pyrrolidine, piperidine, hexamethylene imine, pyridine, pyrole, azatropilidene, quinolone, isoquinoline, and indole.

20. The process of claim 18, wherein at least one organic compound D has the formula $$SR^6R^7$$

where

R$^6$, R$^7$ are each a C$_1$-C$_{20}$-hydrocarbyl radical in which one or more nonadjacent methylene units are optionally replaced by —O—, —CO—, —COO—, —OCO—, or —OCOO—, —S— or —NR$^z$-groups and in which one or more nonadjacent methine units are optionally replaced by —N═, —N═N— or —P═ groups, where the R$^6$, R$^7$ radicals are optionally joined to one another, and R$^z$ is hydrogen or a C$_1$-C$_{10}$-hydrocarbyl radical.

21. The process of claim 20, wherein at least one compound D is selected from the group consisting of thiolane, thiophene, thiane, hexamethylene sulfide, thiotropilidene, and benzothlophene.

22. The process of claim 7, wherein no solvent is present.

23. The process of claim 7, wherein an aprotic solvent selected from the group consisting of hydrocarbon solvents, chlorinated hydrocarbon solvents, siloxanes, and mixtures thereof.

24. The process of claim 1, wherein no solvent is present.

25. The process of claim 1, wherein an aprotic solvent selected from the group consisting of hydrocarbon solvents, chlorinated hydrocarbon solvents, siloxanes, and mixtures thereof.

26. A process for the manufacture of neopentasilane having a low aluminum content, comprising the following steps, in the order given:
a) reducing dodecachloroneopentasilane with an aluminum compound to form a first product mixture containing neopentasilane;
b) following step a), adding an organic compound D which forms an aluminum-containing adduct of compound D which is less volatile than neopentasilane to form a second product mixture; and
c) separating neopentasilane from the second product mixture formed in step b).

* * * * *

UNITED STATES PATENT AND TRADEMARK OFFICE
CERTIFICATE OF CORRECTION

PATENT NO.          : 8,795,613 B2                                          Page 1 of 1
APPLICATION NO.     : 14/004341
DATED               : August 5, 2014
INVENTOR(S)         : Troegel It is certified that error appears in the above-identified patent and that said Letters Patent is hereby corrected as shown below:

In the Claims

Column 9, Line 2, Claim 8:

After "carbonyls"
Delete "carbonyls" (second occurrence).

Column 9, Line 24, Claim 12:

After "process of claim" delete "1" and
Insert -- 11 --.

Column 10, Line 9, Claim 20:

After "process of claim" delete "18" and
Insert -- 1 --.

Signed and Sealed this
Sixth Day of January, 2015

Michelle K. Lee
*Deputy Director of the United States Patent and Trademark Office*